Figure 1:
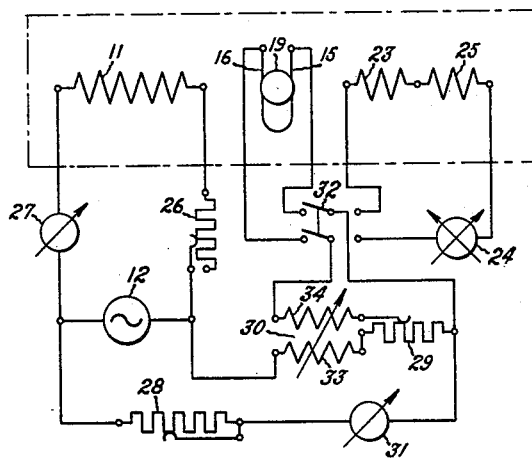

May 1, 1934.  P. C. HERMANN  1,957,211
APPARATUS FOR MAKING MAGNETIC TESTS AND MEASUREMENTS
Filed March 24, 1933

Inventor:
Peter C. Hermann,
by Charles V. Mullen
His Attorney.

Patented May 1, 1934

1,957,211

UNITED STATES PATENT OFFICE 1,957,211

APPARATUS FOR MAKING MAGNETIC TESTS AND MEASUREMENTS

Peter C. Hermann, Berlin-Zehlendorf, Germany, assignor to General Electric Company, a corporation of New York Application March 24, 1933, Serial No. 662,604
In Germany April 6, 1932

7 Claims. (Cl. 175—183)

REISSUED

My invention relates to an apparatus for making magnetic tests and measurements and concerns particularly an arrangement suitable for testing different materials under working conditions. The present application relates to an arrangement for utilizing the apparatus disclosed in my U. S. Patent No. 1,925,872, assigned to the same assignee as the present application in connection with alternating currents and for making measurements of magnetic loss.

In the laboratory, magnetization curves may readily be determined for the purpose of ascertaining the characteristic magnetic constants such as coercive force, remanence, initial and maximum permeability, hysteresis losses and saturation, and the like. Accurate results may be obtained by carrying out the measurements on a closed ring. The laboratory method utilizing a closed ring, however, is not suitable when the tests are to be carried out under working conditions continuously or when it is desired to take repeated measurements on a piece of sheet metal in order to determine the thermal effects, for example.

The necessity for the use of a closed ring has been overcome in certain types of apparatus by building up cores from test strips arranged in layers in a closed form or by utilizing a closing yoke. However, the accuracy of the apparatus and the uniformity of the results is interfered with by the presence of the free poles formed at the abutting joints which tend to demagnetize the magnetic material.

It is an object of my invention to provide an apparatus in which the difficulties of the prior devices are overcome by magnetizing the sample in a coil and taking a direct measurement of the effective field strength as well as the magnitude of other magnetic conditions in the sample. It is a further object of my invention to provide an apparatus in which tests may be made upon small quantities of test material in shapes that may be obtained easily, particularly flat strips or sheets.

In accordance with my present invention apparatus of the type disclosed in my U. S. Patent No. 1,925,872, above-mentioned, is used in conjunction with means for producing alternating currents and controlling their phase relationship. In the form of my invention the sample in the form of a strip of sheet metal is surrounded by a magnetizing winding. The width of the strip is so great that the effect of any hardening at the edge is negligible. The operation of my device depends upon the principle that the actual effective field strength in the metal strip is just as great as the field strength in the air at the surface of the metal. This law is based upon the continuity of the tangential component of the field strength when passing to the outside layers.

One or two filamentary conductors are mounted in close proximity to the surface of the test strip and the deflection of the filaments when a current is passed through them provides an indication of the strength of field at the surface of the magnetic test strip. When using the apparatus with alternating currents, means are provided for causing an alternating current to flow through said filament in phase with the magnetic field to which the test strip is subjected. For making loss measurements the current through the filament is made proportional to and in phase with the magnetic induction through the test strip. Any suitable means such as a microscope used to observe the motion of the filaments or a rotating mirror carried by the pair of filaments in the manner of an oscillograph loop may be employed in conjunction with an optical system in order to provide an indication of the bending of the filaments thereby providing an indication of the strength of field. The features of my invention which I believe to be novel and patentable will be pointed out in the claims appended hereto.

Figure 2:
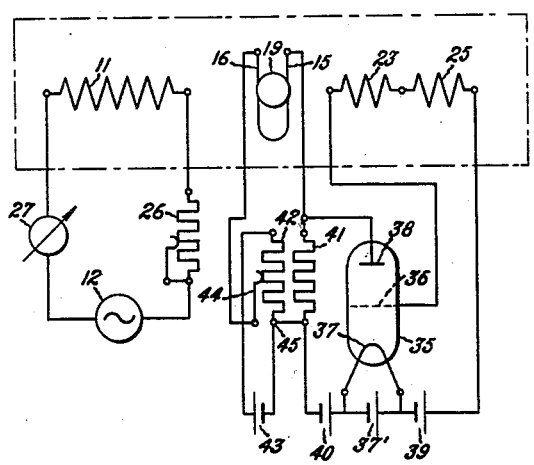
Figure 3:
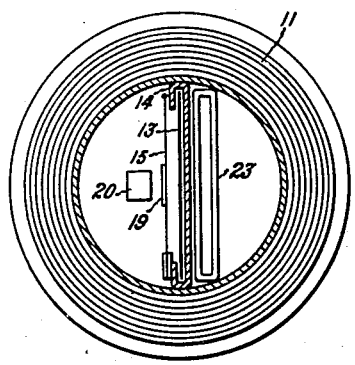
Figure 4:
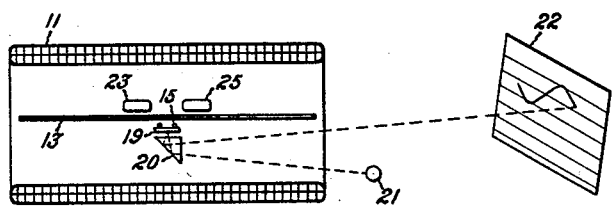

A better understanding itself, however, may be obtained by referring to the following description taken in connection with the accompanying drawing in which Fig. 1 is a circuit diagram of one embodiment of my invention; Fig. 2 is a circuit diagram of a modified arrangement more particularly adapted to measurements taking into consideration the effect of harmonics; Fig. 3 is a cross-sectional view of the apparatus used in connection with the arrangement of Fig. 1; and Fig. 4 is a schematic diagram illustrating the optical circuit of the arrangement shown in Fig. 3 and indicating the apparatus in horizontal longitudinal section.

Referring now more in detail to the drawing in which like reference characters refer to like parts throughout, I provide a cylindrical magnetizing winding 11 energized by any suitable source of alternating current, such as an alternator 12. A test piece 13 is placed in magnetic relation to the magnetizing winding 11. Preferably the test piece 13 takes the form of a flat strip supported within the winding 11 by non-magnetic frame 14.

In order to provide a direct indication of the field strength within and at the surface of the test piece 13, a current-conducting filament 15 is mounted in close proximity to the surface of the test piece 13. Although I am not limited to this specific arrangement, I prefer to employ a pair of parallel filaments 15 and 16 connected in series at one end. An alternating current, also supplied if desired by the alternator 12, is caused to flow through the filaments 15 and 16. Since current flows in opposite directions in the two filaments, they are deflected in opposite directions. A mirror 19 supported between filaments 15 and 16 cooperates with a suitable device 20, such as a mirror or prism, a source of light 21 and a suitable device, such as a screen or a scale 22, to provide an indication of the deflection of the filaments 15 and 16 in response to the reaction between the current flowing in the filaments and a magnetic field at the surface of the test piece 13. It will be understood that if a continuous record is desired suitable means, well known in the art, would be used for causing the light beam to traverse the screen 22 in response to time.

The filaments 15, 16 are located in a field which is made non-uniform in strength due to the presence of the magnetic test piece 13. Thus the field strength is greater on the side of the filament nearest the test piece and less on the side of the filament away from the test piece. The variation in field strength and resulting deflection of the mirror is proportional to this non-uniformity. The non-uniformity is of course proportional to the field strength at the surface of the test piece 13. Since the field strength of the surface of the test piece 13 is the same as the field strength within the test piece, the deflection of the filaments 15 and 16 provides a direct indication of the field strength. In my apparatus, corrections which would have to be made in calculating the field strength from the magnetizing current are therefore rendered unnecessary.

Owing to the fact that the reaction between a current conductor and a magnetic field depends both on the magnitude of the quantities and the phase relationship between them when alternating quantities are involved, it is necessary to fix the phase relationship between the current flowing in filaments 15, 16 and the magnetic field produced by the magnetizing winding 11. Any suitable device such as a phase shifter or a suitable arrangement of variable impedances may be provided for varying the phase relationship. For example, in the arrangement shown in Fig. 1, the alternator 12 is connected to the primary of a controlling circuit through variable resistors 28 and 29, and a variable coupling transformer 30, forming in conjunction with the resistances a complex compensator, is utilized to transfer the energy from this circuit to the filaments 15 and 16. The ammeter 31 serves to indicate the magnitude of the current drawn from the alternator 12 for the energization of the filaments 15 and 16. A double-pole, double-throw switch 32 is provided for opening and closing a circuit from the complex compensator 30 to the filaments 15 and 16. The strength of the current is controlled by adjusting the rheostats 28 and 29, and the phase relationship is adjusted by varying the coupling between the primary and secondary windings 33 and 34 of the transformer 30. By varying the adjustment until the maximum deflection of the mirror 19 is obtained, an adjustment results which corresponds to phase uniformity between the current flowing in the filaments 15, 16 and the magnetic field to which the sample 13 is subjected.

By causing the current flowing in filaments 15 and 16 to vary in phase relationship and magnitude with the magnetic induction through the sample 13, my apparatus may also be utilized to obtain an indication of magnetic loss since, as is well known, the magnetic loss in magnetic material is a function of the product of field strength or magnetizing force and flux density or magnetic induction. To this end a flux measuring coil, preferably divided in two parts 23 and 25, is so arranged that it may be connected to the phase compensator 30 by throwing the double-pole, double-throw switch 32 to the right. The adjustment of the compensator is then varied until the deflection of the alternating current galvanometer 24 falls to zero thereby indicating that the voltage produced by the compensator is exactly opposed in phase and magnitude to the voltage induced in the induction measuring coils 23 and 25 by the magnetic induction in the sample 13. If the double-pole, double-throw switch 32 is then thrown to the left, the current in the filaments 15 and 16 will correspond in magnitude and phase to the magnetic induction of the sample 13 and the deflection of the mirror 19 will provide an indication of the product of magnetizing force and induction thereby permitting the apparatus to be calibrated in terms of magnetic loss.

If the apparatus is to be used for making tests with alternating currents containing harmonics or if the test is intended to take in consideration the harmonics in the wave form of the flux produced by the characteristics of the magnetic material, it is desirable to produce a current in the filaments 15 and 16 which exactly simulates the wave form of the magnetic induction. For this purpose the apparatus disclosed in Fig. 2 may be utilized in which a three-element discharge tube 35 controls the current in the filaments 15, 16 in accordance with the voltage induced in induction measuring coils 23 and 25.

The discharge tube 35 is provided with a control grid 36, a filamentary cathode 37 and an anode 38. The cathode 37 is energized by a filament battery 37'. The induction measuring coils 23 and 25 are connected in the grid circuit of the discharge tube 35 in series with a grid battery 39 between the cathode 37 and the control grid 36 so that the potential of the control grid varies with the voltage induced in the induction measuring coils 23 and 25. The plate circuit of the discharge tube 35 contains a source of plate potential 40 and a resistor 41 connected in series between the anode 38 and the cathode 37. The filamentary conductors 15 and 16 are connected in a circuit which is connected in parallel to the resistor 41 so that the current in filaments 15 and 16 varies with the plate current of the discharge tube. It will be understood that the discharge tube is to be operated in the straight portion of its characteristic curve so that the plate current will vary linearly with the grid voltage.

The direct current component of the plate current may be balanced out, if desired, by means of a compensator consisting of potentiometer 42 energized by a battery 43. The portion of the potentiometer 42 between its variable tap 44 and its terminal 45 and the filaments 15, 16 in series are connected across the resistor 41. The polarity of the battery 43 and the setting of the tap 44 is such that the direct current component of the plate current is compensated and no current flows in filaments 15 and 16 when the induction in the sample 13 and consequently the voltage induced in induction measuring windings 23 and 25 is zero. Since the plate current in the discharge tube 35 responds with very great rapidity to variations in the grid voltage, the plate current and consequently the current flowing in substantially non-inductive circuit of filaments 15 and 16 follows the magnetic induction of the sample 13 however complex its wave form may be. In consequence, the apparatus may be used for measuring the loss in the samples subjected to magnetizing currents of different wave forms and regardless of the distortion of the wave form resulting from the characteristics of the material being tested.

In accordance with the provisions of the patent statutes I have described the principle of operation of my invention together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. Apparatus for making magnetic measurements of magnetic samples having flat surfaces, comprising an alternating current magnetizing winding, means for supporting such a sample in testing position in magnetic relation with said winding, a flexible current conductor supported so as to be parallel with and in relatively close proximity to the surface of a sample in testing position, and means for supplying to said conductor an alternating current in phase with a magnetic field in said sample, thereby causing a deflection of said conductor and an indication of the strength of said magnetic field in the sample under test.

2. Apparatus for making magnetic measurements of test pieces having flat surfaces, comprising a magnetizing winding arranged to surround said test piece, means for energizing said winding with alternating current, a pair of current-conducting filaments connected in series and supported transverse to the axis of said magnetizing winding so as to be parallel with and in relatively close proximity to the surface of a piece in testing position, said pair of filaments being twisted in accordance with the magnetic field strength to which the test piece is subjected thereby providing a direct response to the strength of said field, and means for causing an alternating current to flow through said conducting filaments in phase with the current energizing said magnetizing winding.

3. Apparatus for making magnetic measurements of magnetic samples having flat surfaces comprising an alternating current magnetizing winding arranged to permit placing such a sample in magnetic relation thereto in testing position, a flexible current conductor supported so as to be parallel with and in relatively close proximity to the surface of a sample in testing position, and means for supplying to said flexible conductor an alternating current and controlling the phase relationship thereof.

4. Apparatus for making magnetic measurements of magnetic samples having flat surfaces, comprising an alternating current magnetizing winding, means for supporting such a sample in testing position in magnetic relation with said winding, a flexible current conductor supported so as to be parallel with and in relatively close proximity to the surface of a sample in testing position, and a complex compensator for supplying to said conductor an alternating current in phase with the field produced by said magnetizing winding so as to cause a deflection of said conductor and an indication of the magnitude of a magnetic condition in a sample under test.

5. Apparatus for measuring magnetic loss in magnetic samples having flat surfaces, comprising a magnetizing winding, means for supporting such a sample in testing position in magnetic relation with said winding, a flexible current conductor supported so as to be parallel with and in relatively close proximity to a surface of a sample in testing position, a straight-sided coil supported so as to be in close proximity to a surface of the sample under test with its magnetic axis parallel to the sample and to the axis of said magnetizing winding, means associated with said coil for supplying an electrical current to said flexible current conductor varying in phase and magnitude with variations in magnetic induction through said straight-sided coil whereby said flexible conductor is caused to deflect an amount dependent upon the product of field strength and magnetic induction so as to give an indication of magnetic loss.

6. Apparatus for measuring magnetic loss in magnetic samples, comprising means for subjecting a sample to be tested to an alternating magnetic field, a flexible conductor subjected to a field substantially equal to that within said sample and means for causing a current to flow through said conductor varying in phase and magnitude with the magnetic induction in said sample, whereby said conductor is caused to deflect an amount dependent upon the product of field strength and magnetic induction thereby giving an indication of magnetic loss in said sample.

7. Apparatus for making magnetic measurements of magnetic samples having flat surfaces, comprising a magnetizing winding, means for supporting a sample in testing position in magnetic relation with said winding, a flexible current conductor supported so as to be parallel to and in relatively close proximity to the surface of a sample in testing position, an induction measuring coil in magnetic relation with said sample so as to have induced therein a voltage proportional to the magnetic induction in said sample, a three-element discharge tube having a control grid, a source of current energizing said tube, said control grid being connected to said induction measuring coil and said flexible conductor being connected in series with said discharge tube whereby a current is caused to flow through said flexible conductor varying in phase and magnitude with the magnetic induction through said magnetic sample thereby causing said flexible conductor to be deflected an amount dependent upon the product of magnetic induction and field strength to which said sample is subjected.

PETER C. HERMANN.